United States Patent

Cantrell et al.

[11] Patent Number: 5,135,580
[45] Date of Patent: Aug. 4, 1992

[54] FILTER-WASHING SYSTEM

[75] Inventors: Henry L. Cantrell; Glenn M. Wethington, both of Bowling Green, Ky.

[73] Assignee: Union Underwear Co., Inc., New York, N.Y.

[21] Appl. No.: 676,101

[22] Filed: Mar. 27, 1991

[51] Int. Cl.5 .................................. B08B 3/02
[52] U.S. Cl. ............................ 134/22.11; 134/23; 134/24; 134/152; 134/167 R; 134/200
[58] Field of Search ............... 134/152, 166 R, 167 R, 134/103, 200, 22.11, 23, 24, 22.12, 111; 15/304

[56] References Cited

U.S. PATENT DOCUMENTS

| | | | |
|---|---|---|---|
| 3,120,346 | 2/1964 | Willhoite | 239/215 |
| 3,121,536 | 2/1964 | McKibben | 239/253 |
| 3,442,273 | 5/1969 | Hanish et al. | 134/152 X |
| 3,472,251 | 10/1969 | Parker, Jr. | 134/138 |
| 3,526,237 | 9/1970 | Neill, Jr. | 134/152 X |
| 3,604,437 | 9/1971 | Tappan, Jr. | 134/167 R X |
| 3,606,897 | 9/1971 | Tobin, III et al. | 134/152 X |
| 3,873,364 | 3/1975 | Smith | 134/138 |
| 3,998,656 | 12/1976 | Grotto | 15/304 X |
| 4,178,652 | 12/1979 | Adams et al. | 15/302 |
| 4,299,245 | 11/1981 | Clapper | 134/140 |
| 4,585,019 | 4/1986 | Jacobson | 134/152 X |
| 4,708,152 | 11/1987 | Hibberd | 134/138 |
| 4,808,234 | 2/1989 | McKay et al. | 134/167 R |
| 4,815,523 | 3/1989 | Dehli et al. | 134/167 R |
| 4,828,179 | 5/1989 | Garner | 239/240 |
| 4,913,346 | 4/1990 | Nakamura | 239/225.1 |
| 4,967,776 | 11/1990 | Folmar | 134/103 X |

*Primary Examiner*—Frankie L. Stinson
*Attorney, Agent, or Firm*—Milton Gerstein; Marvin Benn

[57] ABSTRACT

An apparatus for washing cylindrical filters has a tiltedly-mounted main housing in which is provided a plurality of rotatable shafts each mounting thereabout one cylindrical filter for rotation therewith. The tilted mounting causes the wash water, after cleaning the filters, to fall by gravity therebelow, and exit from the apparatus at a lower exit corner thereof. From the exit corner of the apparatus, the effluent wash water passes through a cloth filter provided on a portable container before the effluent wash water is carried away by a drain grate formed in the floor. The cloth filter removes the sold waste from the effluent wash water, so that the potentially hazardous waste material may be disposed of in a suitable dump site. A plurality of high-pressure, water-spray nozzle heads are mounted for reciprocal translation above the shafts for directing the high-intensity water spray to the cylindrical filter.

19 Claims, 5 Drawing Sheets

FILTER-WASHING SYSTEM

BACKGROUND OF THE INVENTION

The present invention is directed to an apparatus for washing and removing embedded waste material in cylindrical filters used in cloth-dyeing equipment. Cylindrical filters are used in conventional cloth-dyeing equipment in order to remove residues, such as lint, from the discharge waste water of a die block. The liquid waste passes through the cylindrical filter radially and out the end, longitudinally-axially therethrough. After continued use, these cylindrical filters become embedded with waste material, affecting the filtering capabilities of the filters. Hithertofore, each cylindrical filter has been washed manually, by removing the filter from the cloth-dyeing equipment, and simply spraying it with a water hose and pressurized nozzle, with the effluent water's solid waste being carried away through a bucket type strainer and on through a drain grate adjacent the cloth-dyeing equipment, in the location where the filters are sprayed via the hose. Such prior-art method, clearly, is time-consuming and labor-intensive, requiring a large amount of manual labor, which is a relatively costly process. The present invention provides a more effective washing of the filters, in order to remove most, if not all, of the waste material embedded in the filters, and, also, does so in a faster, less labor-intensive, and a less costly manner.

SUMMARY OF THE INVENTION

It is the primary objective of the present invention to provide an apparatus that will automatically wash a plurality of cylindrical filters used in cloth-dyeing equipment, in order to increase productivity and overall efficiency.

It is another objective of the present invention to provide such a filter-washing apparatus that can accommodate two configurations of cylindrical filters used in cloth-dyeing equipment.

It is still another objective of the present invention to provide such a filter-washing apparatus that itself filters out the solid waste-material from the effluent water emanating from the cylindrical filters, which effluent is the wash-water used for washing the filters, which waste-material is collected before the effluent water exits through a drain grate formed in the floor under the system of the invention.

It is yet another objective of the present invention to provide such a filter-washing apparatus that utilizes high-pressure, high velocity, spray-nozzle heads which rotate for directing the washing spray to the cylindrical filters, which filters are rotated in a first direction during a first direction of longitudinal translation of the nozzle heads, and which are rotated in a second, longitudinal direction during a second, opposite translation of the nozzle heads, in order to increase the effectiveness of the cleaning of the filters.

It is still another objective of the present invention to provide such a filter-washing apparatus to collect the solid waste material removed from the filters during washing in a portable container for the dumping of the solid wastes at a protected and safe dump site.

According to the invention, the apparatus for washing cylindrical filters comprises a main housing in which is provided a plurality of rotatable shafts or mandrels, with each shaft mounting thereabout one cylindrical filter for rotation therewith. The shafts, and therefore the filters, are inclinably mounted, so that the longitudinal, central axis of each forms a 45 degree angle with respect to the horizontal, by which the wash water, after cleaning the filters, will fall by gravity therebelow, and exit from the apparatus at a lower exit corner thereof. Form the exit corner of the apparatus, the effluent wash water, with removed solid waste material therewith, passes through a cloth filter provided on a portable container before the effluent wash water is carried away by a drain grate formed in the floor. The cloth filter removes the sold waste from the effluent wash water, so that the waste material may be disposed of in a suitable dump site.

Operatively associated with the plurality of rotating mandrels are a plurality of high-pressure, water-spray nozzle heads, with one such nozzle head for each mandrel. Each nozzle head is mounted for longitudinal translation above a respective mandrel for directing the high-intensity water spray to the cylindrical filter mounted about that mandrel. During the first stroke, or longitudinal translation, of the nozzle head, the respective mandrel is rotated in a first direction, and during the return stroke, or longitudinal translation, of the nozzle head, that respective mandrel is rotated in the opposite direction, whereby the likelihood of waste removal from the filter is greatly enhanced. One reversible motor drives the movement of the nozzle heads and the rotation of the plurality of mandrels.

BRIEF DESCRIPTION OF THE DRAWINGS

The invention will be more readily understood with reference to the accompanying drawing, wherein.

DETAILED DESCRIPTION OF THE INVENTION

Figure 3:
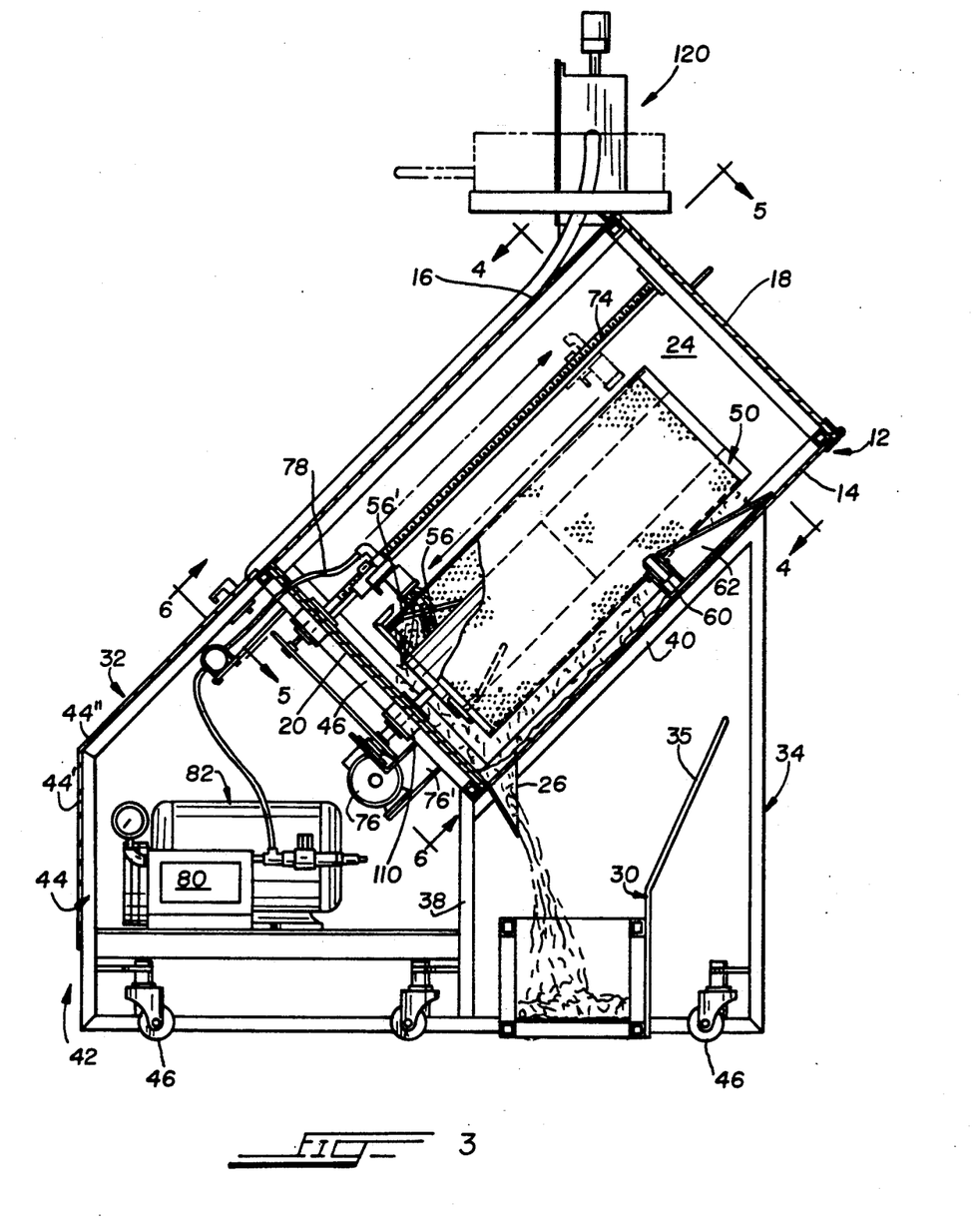
FIG. 3 is a cross-sectional view taken along line 3—3 of FIG. 2.

Referring now to the drawings in greater detail, the filter-washing apparatus of the invention is indicated generally by reference numeral 10. The apparatus 10 has a main housing 12 which, in the preferred embodiment, is tilted or mounted at a 45 degree angle with respect to the horizontal, as clearly seen in FIGS. 1 and 3. This tilting of the main housing 12 ensures that the washing water used to wash the filters will exit from one specific location, as described below, so that the effluent may first be first filtered of solid waste material before the disposal thereof down a floor drain, and allows easy loading and unloading. The main housing 12 has a front wall 14, rear wall 16 top wall 18, bottom wall 20, and side walls 22, 24. Each wall is tilted and forms an acute angle with respect to a horizontal, as described above. The top wall 18 has a pivotal cover door 18' (see FIG. 9) by which access into the interior of the main housing is achieved in order to insert dirty filters needing to be washed, and to remove them after washing. The intersection of the front wall 14 and the bottom wall 20 is formed with an opening and an exit outlet or trough 26 through which the effluent flows, which effluent includes a mixture of washing water and sold waste material removed from the cylindrical filters washed thereby. The spout 26 directs the effluent to a portable or removable container 30 positionable below the trough, whereby the sold waste material in the effluent may be filtered out before the effluent is drained through a drain formed in the floor therebelow, as described below in greater detail. The main housing 12 is tiltably mounted via a mounting frame 32 consisting of a front or forward section 34. The front section also has a pair of side panels or splash guard-walls 22', 24', each defining a sloping upper edge surface which supports the main housing in its tilted state. The mounting frame also has a rear section 42 having a rear wall 44 consisting of a first vertical wall section 44' and a second tilted or forwardly sloping wall section 44", as best seen in FIG. 3, with the tilted wall section 44" being substantially coplanar with the rear wall 16 of the main housing. The upper end of the wall section 44" terminates considerably above the upper end of the vertical rear wall 38 of the front section 34, whereby an upper, tilted supporting wall 46 is provided which supports thereon the bottom wall 20 of the main housing 12. The rear section 42 also has a pair of side of side members or meshes 22" which serve as motor guards. The frame 32 is provided with swivel casters 46 in the front and rear sections thereof by which the entire apparatus 10 is made portable.

Figure 4:
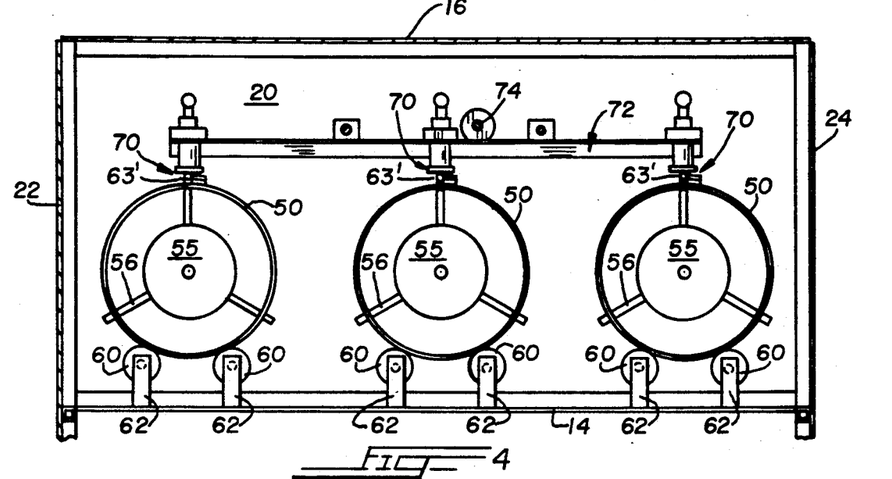
FIG. 4 is a cross-sectional view taken along line 4—4 of FIG. 3.
Figure 5:
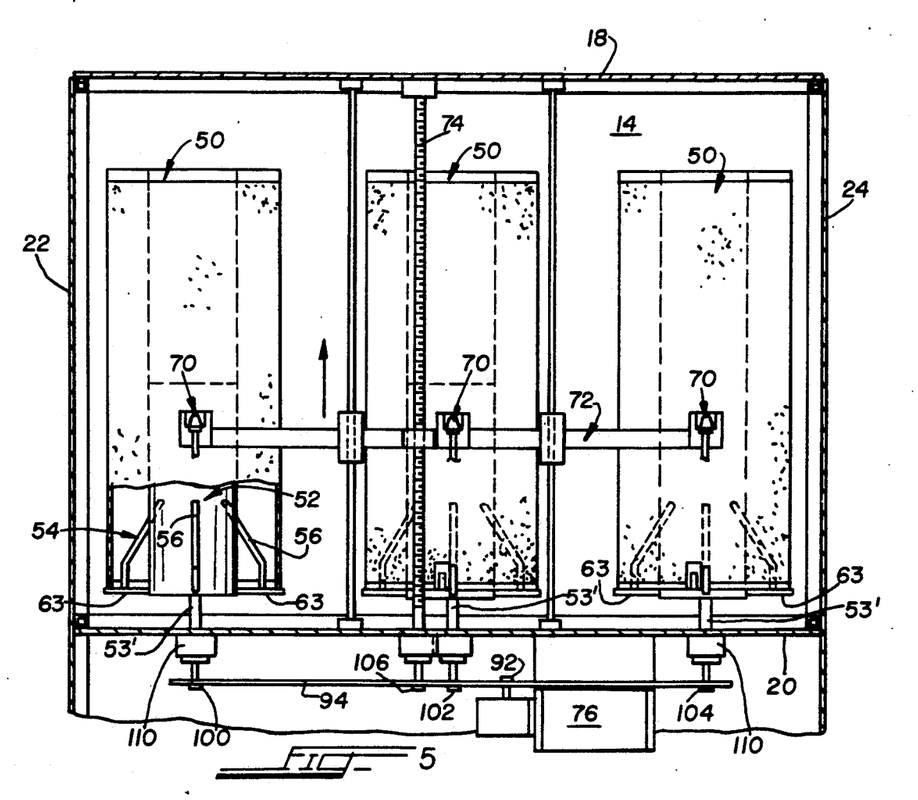
FIG. 5 is a cross-sectional view taken along line 5—5 of FIG. 3.
Figure 9:
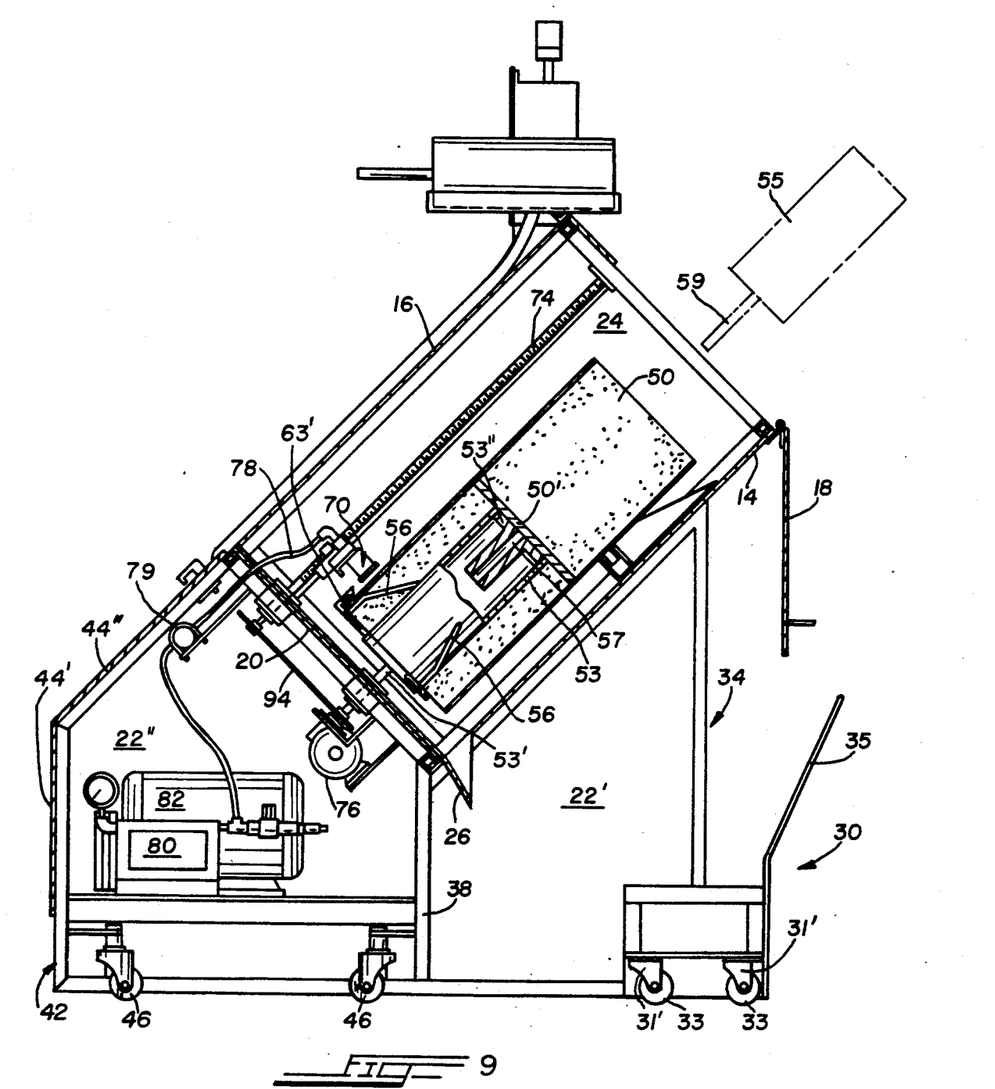
FIG. 9 is a side elevational view, in cross section, similar to FIG. 3, but showing the rotatable shafts of the apparatus holding a second type of cylindrical filter having an enlarged, intermediate flange member, whereby the outer half of each shaft of the apparatus of the invention is removed and placed in holders in order to accommodate this second type of cylindrical filter.

The main housing 14 essentially serves as wash tank for washing clean a plurality of cylindrically-shaped filters 50. The filters 50 are used in cloth-dyeing equipment for removing wastes and other contaminants from the dyeing process. The solution flows radially into the filter and then longitudinally axially through the cylindrical filter, which filter periodically requires washing for removing the solid waste adhered thereto. The main housing 12, therefore, has a plurality of rotatable filter-supporting shafts or mandrels 52, which in the preferred embodiment number three. Each shaft 52 supports one cylindrical filter for rotating the filter during the washing process. As seen in FIGS. 4-8, each shaft 52 is comprised of two like parts: A lower part 53 and an upper part 55, as seen in FIG. 9. The upper and lower parts are removable from each other for purposes described below. The lower part 53 has a lower projecting rod 53' by which the entire shaft and filter are rotated by the drive means of the invention described below, and has an enlarged upper flange end 53" by which an outer, main elongated portion 52', that extends through the central, axial opening of a filter 50, is supported. An axial opening 57 is provided at the upper end portion of the central core of the lower section for receiving a lower projecting rod 59 of the upper section by which the upper section is removably secured to the lower section. The lower section or part 53 also has a spider member 54 positioned at its lower end portion, which spider member defines a plurality of angularly-spaced apart, sloping holding arms 56, with each arm 56 having a lower, outer flat section 56' about which the lower end of the cylindrical filter 50 is loosely retained thereon. The upper section 55 is virtually identical to the lower section except that the upper section does not have a spider arm 54 nor an axial opening 57. Each filter 50 is telescopingly mounted about the outer main elongated portions of the two sections 53, 55 of a shaft by the annular spider member 54, as best seen in FIGS. 3 and 5, and by a pair of rollers 60 mounted to the interior surface of the front wall 14. Six such rollers are provided, with each pair of rollers 60 supporting an upper portion of one cylindrical filter 50 for rotation, as clearly shown in FIG. 3. There are two such rollers 60 for the each shaft 52 as best seen in FIG. 4. Mounting brackets 62 rotatably mount the rollers 60 to the interior surface of the front wall, with the brackets, and therefore the rollers, being spaced apart in the widthwise direction in order to juxtaposition each adjacent pair of rollers under a respective rotatable shaft 52 for rotatably supporting one cylindrical filter for rotation. Each spider member 54 also has three spokes 63 spaced 120 degrees apart, with one of the three spokes terminating in a horizontal, right-angle piece 63'. The lower end of a cylindrical filter 50 abuts against these spokes 63, with the horizontal piece 63' working with the flat, horizontal sections 56' of the spider member to receive therebetween the lower, outer circumferential surface of a cylindrical filter 50, for retaining the filter thereby during rotation. The filter is caused to rotate by the engagement of the horizontal, right-angle piece 63' with one of the three conventional protruding latches 51" (FIG. 7) provided on the outer circumference of the filter at its lower end. These latches are conventionally used for removably, axially-interconnecting two or more cylindrical filters in the dyeing apparatus. When the rotation of the lead screw is reversed, the right-angle piece 63' will rotate almost a full turn before engaging the latch 51" on the opposite side. Also, as shown in FIG. 9, the upper section 55 may be removed in order to accommodate a cylindrical filter 50 having an interior, central partition 50', which partition rests upon the upper edge-face of the lower section 53.

Mounted above the rotatable mandrels 52 are a similar number of nozzles 70 for directing a high-pressure stream of water to the cylindrical filters for washing them free of solid and other waste material, for subsequent reuse in the cloth-dyeing equipment. The three nozzles 70 are interconnected as one unit and reciprocably translate back and forth above the mandrels and the filters supported thereby. The nozzles 70 are interconnected by a connecting arm 72 best seen in FIG. 5, which connecting arm 72 has a central threaded opening that receives therethrough a lead screw 74. The lead screw 74 is mounted for rotation between the top wall 18 and bottom wall 20. Rotation of the lead screw in a first direction causes the simultaneous translation of the three nozzles 70 in one direction, while rotation of the lead screw in a second, opposite direction causes translation of the three nozzles in the opposite direction. As each nozzle 70 translates longitudinally above a respective mandrel with filter, the mandrel is also rotated to rotate the filter to expose the full 360 degree circumference of the filter to the high-pressures water stream. The rotation of the mandrels occurs in the same direction as the lead screw, so that when the lead screw's rotation is changed to translate the nozzles in the opposite direction, the direction of rotation of each mandrel is also changed, whereby solid particles not removed during the first translation of the nozzles would have a better chance of removal by exposure to the high-pressure water-stream by rotation of the mandrel in the opposite direction. Reversal of rotation of the lead screw is achieved by conventional contact limit switches stationed at the ends of the lead screw, which limit switches, upon being actuated by one of the nozzles 70, will cause a reversible d.c. gear-motor 76 to reverse direction. Each nozzle 70 is supplied water via a hose 78, a common supply line or manifold 79 feeding water to the three hoses 78, and a water pump 80 and associated three-phase, a.c. motor 82. Each nozzle is a conventional, rotary, nozzle head, which may be purchased from the Bill Voorhees Company, Nashville, Tenn. Each nozzle head provides a water-spray at 2000 psi at a temperature of 140 degrees F., with a flow rate of 2.9 gpm, and, while translating along a respective rotating cylindrical filter, also rotates in order to increase its effectiveness. The pump 80, motor 82, and common supply line or manifold 79 are mounted in the rear section 42 of the mounting frame 32, as clearly shown in FIGS. 3 and 9. A conventional water-pressure switch 79, such as a Bachman pressure switch part number S-225, detects the water pressure, and if there is no water feed, for whatever reason, power to the AC motor 82 and DC motor 76 is cut off.

Figures 6, 7:
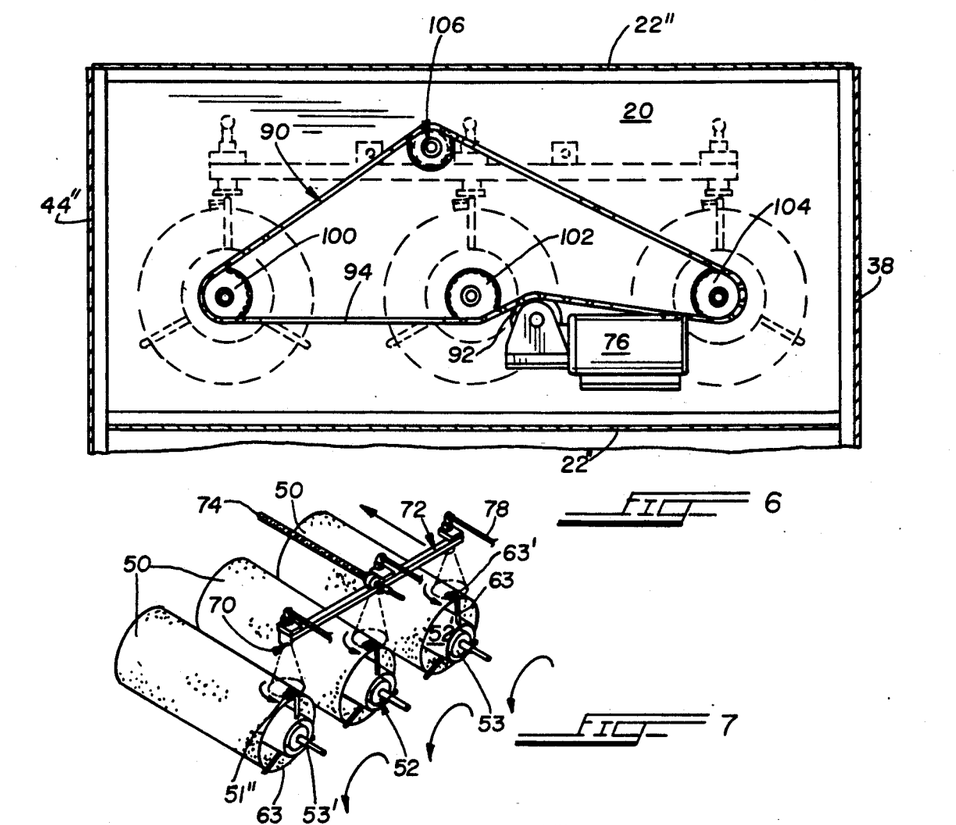
FIG. 6 is a cross-sectional view taken along line 6—6 of FIG. 3.
FIG. 7 is an isometric, detailed view of the three filter-supporting rotatable shafts with reciprocating nozzle heads thereabove of the apparatus of the invention, showing the nozzle heads and filters moving in a first direction.
Figure 8:
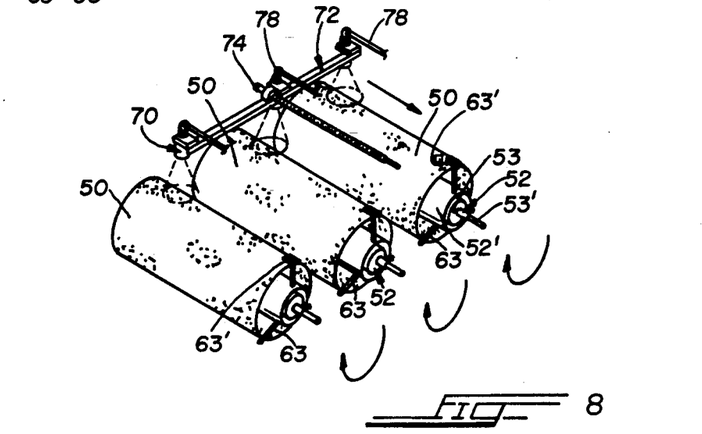
FIG. 8 is an isometric, detailed view of the three filter-supporting rotatable shafts with reciprocating nozzle heads thereabove of the apparatus of the invention, showing the nozzle heads and filters moving in a second, opposite direction.

The reversible d.c. motor 76 not only drives the lead screw 74, but also rotates each of the rotatable mandrels 52, via the projecting rod 53' thereof, by means of a sprocket-and-chain arrangement 90 best seen in FIG. 6. The d.c., right-angle gear motor 76 drives a main drive-sprocket 92 which drives a chain 94, which, in turn, rotates driven sprockets 100, 102 and 104 operatively coupled to the three mandrels 52. Fourth driven sprocket 106 is operatively coupled to the lead screw 74. The sprockets 100, 102 and 104 are preferably ⅜ pitch, 26 tooth wheels, while the sprocket 106 is ⅜ pitch, 10 tooth wheel. The sprockets are chosen so that each mandrel Will have rotated one complete rotation before the washing water spray from a respective nozzle 70 will have translated a distance greater than the linear, horizontal range of the nozzle spray, so as to ensure that the entire circumferential surface of each cylindrical filter has been exposed to the spray during each translation of the nozzle. The d.c. motor 76 is mounted to the lower or bottom wall 20 of the main housing 12 by a bracket or ear 76', as best seen in FIG. 3, with the associated sprockets being mounted to and projecting below the bottom wall 20, with each respective projecting shaft 53' and lead screw 74 being coupled to one sprocket via a conventional coupler 110.

Figure 1:
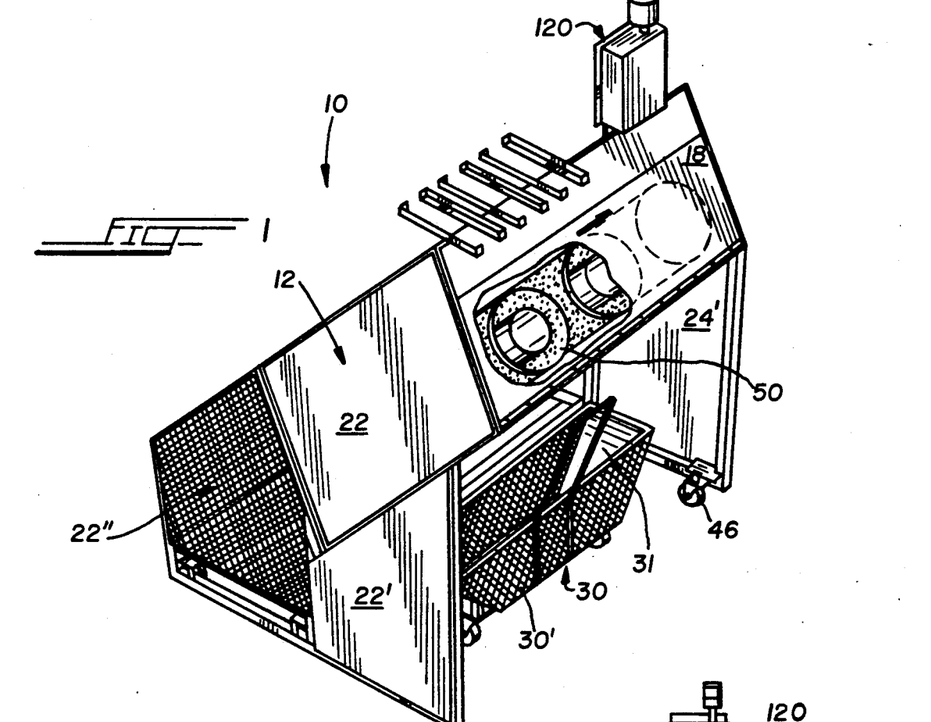
FIG. 1 is an isometric view of the filter-washing system of the invention.
Figure 2:
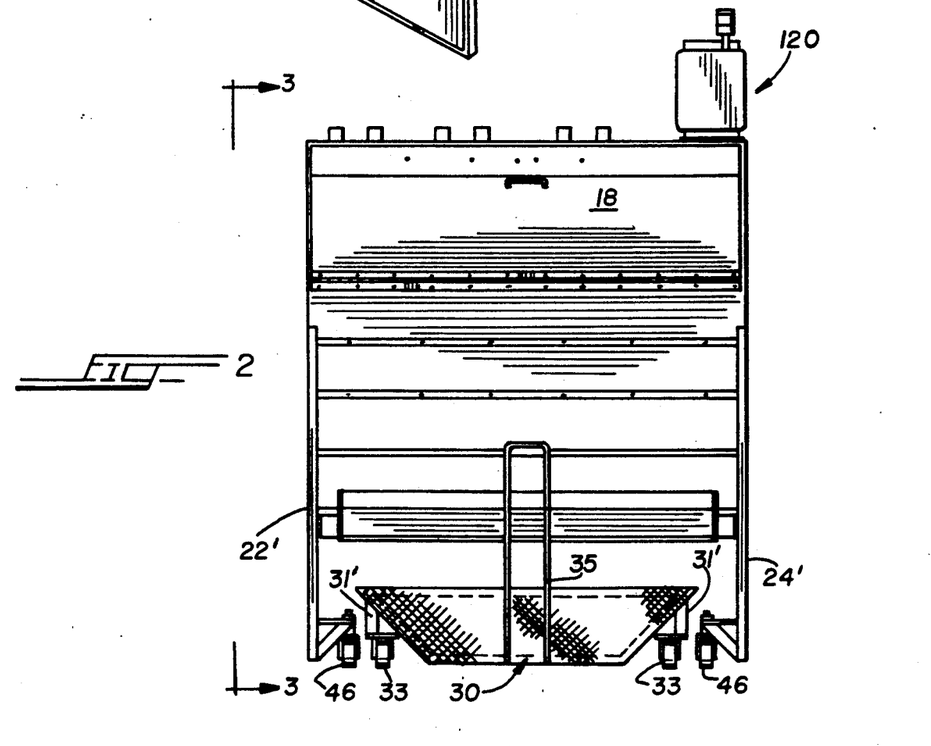
FIG. 2 is a front view thereof.

As mentioned above, a portable cart or wagon 30 is used, which cart holds a cloth filter through which passes the effluent exiting from the outlet 26. The cloth filter is a conventional type of filter, and it filters out solid wastes, such as lint, from the effluent. The lint wagon 30 is best seen in FIGS. 1 and 9, and is made of a main body portion 30' of steel-wire mesh material, or the like, which allows the effluent to flow therethrough and directly into a drain hole (not shown) in the floor therebelow. The side walls 31, however, are steel plates that slope downwardly and inwardly toward each other, so that the effluent impinging thereon will be directed toward the bottom wall made of mesh material. Each side plate 31 mounts a pair of pedestals or braces 31', with each pedestal mounting a caster 33, whereby a total of four casters are provided by which the cart 30 may be rolled from the apparatus 10 to a dump site where the solid wastes are disposed of. A handle 35 allows one to grip the cart. The two rear casters, which are closest to the rear mesh panel that mounts the handle 35, are swivel casters, while the two front casters are rigid casters. The cloth filter (not shown) is draped inside the interior of the cart.

A computerized control unit 120 may be provided that automatically controls the various operating parts, so that one or two complete cycles of operation may be performed.

While a specific embodiment of the invention has been shown and described, it is to be understood that numerous changes and modifications may be made therein without departing from the scope, spirit and intent of the invention as set forth in the appended claims.

While drawings have shown each shaft 52 having three spokes 63, one may alternatively provide each shaft 52 with four such spokes 63, 90 degrees apart providing full equivalency of three spokes, it being that still only right-angle piece 63' being provided.

What I claim is:

1. An apparatus for washing filters, comprising:
   a main housing having an interior;
   a plurality of rotatable filter-supporting means also mounted in said interior of said housing for supporting filters for rotation, one said means for one filter;
   a plurality of nozzle means for directing a washing spray toward said plurality of filter-supporting means also mounted in said interior of said main housing, each said nozzle means being operatively associated with one said filter-supporting means;
   means for reciprocably translating said plurality of nozzle means along said plurality of filter-supporting means, each said nozzle means being reciprocably translated along the length of the respective filter as the filter is rotated;
   means operatively coupled to said plurality of nozzle means for supplying washing fluid to said plurality of nozzle means; and
   drive means for rotating said plurality of filter-supporting means and for driving said means for reciprocably translating said plurality of nozzle means;
   said means for reciprocably translating said plurality of nozzle means along said plurality of filter-supporting means simultaneously translating all of said plurality of nozzle means together;
   said drive means for rotating said plurality of filter-supporting means and for driving said means for reciprocably translating said plurality of nozzle means comprising means operatively coupled to said filter-supporting means and said nozzle means for reversing the direction of rotation of said filter-supporting means substantially simultaneously with the reversal of direction of translation of said nozzle means.

2. The apparatus according to claim 1, wherein said plurality of filter-supporting means comprises a plurality of rotatable shafts, each said shaft having a central longitudinal axis, and each said shaft being mounted in said interior of said main housing so that the respective said central longitudinal axis forms an acute angle with respect to the horizontal, whereby each said shaft is inclined; said plurality of nozzle means being mounted for reciprocable translation parallel to and above said shafts.

3. The apparatus according to claim 2, wherein said main housing is also mounted at an acute angle with respect to the horizontal, and comprises a front wall, a rear wall, a pair of side walls, and a bottom wall, each said wall forming an angle with respect to the horizontal, and an outlet opening formed at the intersection between said bottom wall and one of said front and rear walls through which flows out the effluent used for washing the filters, for the subsequent disposal thereof; and a frame means for supporting said main housing in its angular orientation.

4. The apparatus according to claim 3, further comprising a portable container that is positionable under said outlet opening of said main housing; said portable container comprising a filter means for removing solid wastes from said effluent exiting from said main housing, the filtered effluent then passing through said portable container for drainage into a drain grate formed in the floor upon which the apparatus is supported.

5. The apparatus according to claim 4, wherein said portable container comprises a main body having an open bottom for allowing said effluent to flow out therefrom; roller means for allowing said container to be moved from one location to another; and handle means for moving said container.

6. The apparatus according to claim 3, wherein said main housing further comprises a plurality of spaced-apart rollers mounted in said interior by said front wall thereof, said rollers being divided into pairs of said rollers, each said pair rotatably supporting a filter thereon; each said pair of rollers being positioned adjacent an upper end portion of a respective said rotatable shaft, whereby the upper end portion of a filter is rotatable supported by a said pair of rollers, while the lower end portion is supported by a said shaft.

7. The apparatus according to claim 1, further comprising roller means for supporting said main housing on the floor and for allowing for the portable transport thereof along the floor.

8. The apparatus according to claim 1, wherein said plurality of filter-supporting means comprises a plurality of rotatable shafts, each said shaft having a central longitudinal axis, each said shaft comprising a first lower part and a second upper part securable to said first lower part, said first and second parts having cooperating means for removably mounting said second part to said first part, whereby filters of different design may be accommodated thereby.

9. The apparatus according to claim 1, wherein said plurality of filter-supporting means comprises a plurality of rotatable shafts, each said shaft having a central longitudinal axis, each said shaft having a lower end portion and an upper end portion, and filter-holding means provided about a portion of the circumference of said lower end portion for frictionally and removably retaining a filter thereon.

10. The apparatus according to claim 9, wherein said main housing further comprises a plurality of spaced-apart rollers mounted in said interior by said front wall thereof, said rollers being divided into pairs of said rollers, each said pair rotatably supporting a filter thereon; each said pair of rollers being positioned adjacent said upper end portion of a respective said rotatable shaft, whereby the upper end portion of a filter is rotatable supported by said pair of rollers.

11. An apparatus for washing filters, comprising:
a main housing having an interior;
a plurality of rotatable filter-supporting means also mounted in said interior of said housing for supporting filters for rotation, one said means for one filter;
a plurality of nozzle means for directing a washing spray toward said plurality of filter-supporting means also mounted in said interior of said main housing, each said nozzle means being operatively associated with one said filter-supporting means;
means for reciprocably translating said plurality of nozzle means along said plurality of filter-supporting means, each said nozzle means being reciprocably translated along the length of the respective filter as the filter is rotated;
means operatively coupled to said plurality of nozzle means for supplying washing fluid to said plurality of nozzle means; and
drive means for rotating said plurality of filter-supporting means and for driving said means for reciprocably translating said plurality of nozzle means;
said means for reciprocably translating said plurality of nozzle means comprising a rotatable lead screw mounted above said plurality of shafts, a connecting support arm mounting said pluarlity of nozzle means in a spaced-apart manner where each said nozzle means is juxtapositioned above a respective said shaft; said support arm having a threaded opening for mating with said lead screw, whereby rotation of said lead screw in a first direction simultaneously translates said plurality of nozzle means in a first direction, and rotation of said lead screw in the opposite direction simultaneously translates said plurality of nozzle means in the opposite direction;
said drive means for rotating said plurality of filter-supporting means and for driving said means for reciprocably translating said plurality of nozzle means simultaneously rotating said lead screw and said rotatable shafts; said drive means comprising a reversible motor, a plurality of sprockets, one said sprocket for one said shaft and lead screw, and a chain driven by said motor, whereby when the rotation of said lead screw changes direction, the rotation of said rotatable shafts changes direction therewith.

12. An apparatus for washing filters, comprising:
a main housing having an interior;
at least one rotatable filter-supporting means also mounted in said interior of said housing for supporting at least one filter for rotation;
at least one nozzle means for directing a washing spray toward said at least one rotatable filter-supporting means also mounted in said interior of said housing, said at least one nozzle means being operatively associated with said at least one said filter-supporting means;
means for reciprocably translating said at least one nozzle means along said at least one filter-supporting means, said at least one nozzle means being reciprocably translated along the length of the filter as it is rotated;

means operatively coupled to said at least one nozzle means for supplying washing fluid thereto; and drive means for rotating said at least one filter-supporting means and for driving said means for reciprocably translating said at least one nozzle means;

said at least one filter-supporting means comprising at least one shaft, said shaft having a central longitudinal axis, said shaft comprising a first part and a second part securable to said first part, said first and second parts having cooperating means for removably mounting said second part to said first part, whereby filters of different design may be accommodated thereby.

13. An apparatus for washing filters, comprising:

a main housing having an interior;

a plurality of rotatable filter-supporting means also mounted in said interior of said housing for supporting filters for rotation, one said means for one filter;

a plurality of nozzle means for directing a washing spray toward said plurality of filter-supporting means also mounted in said interior of said main housing, each said nozzle means being operatively associated with one said filter-supporting means;

means for reciprocably translating said plurality of nozzle means along said plurality of filter-supporting means, each said nozzle means being reciprocably translated along the length of the respective filter as the filter is rotated;

means operatively coupled to said plurality of nozzle means for supplying washing fluid to said plurality of nozzle means; and drive means for rotating said plurality of filter-supporting means and for driving said means for reciprocably translating said plurality of nozzle means;

said main housing further comprising a plurality of spaced-apart rollers mounted in said interior by said front wall thereof, said rollers being divided into pairs of said rollers, each said pair rotatably supporting a filter thereon; each said pair of rollers being positioned adjacent said upper end portion of a respective said rotatable shaft, whereby the upper end portion of a filter is rotatable supported by said pair of rollers.

14. An apparatus for washing filters, comprising:

a main housing having an interior;

at least one rotatable filter-supporting means mounted in said interior of said housing for supporting filters for rotation;

at least one nozzle means for directing a washing spray toward said at least one filter-supporting means also mounted in said interior of said main housing;

means for reciprocably translating said at least one nozzle means along said at least one filter-supporting means, said nozzle means being reciprocably translated along the length of a filter as the filter is rotated;

means operatively coupled to said at least one nozzle means for supplying washing fluid to said at least one nozzle means;

drive means for rotating said at least one filter-supporting means and for driving said means for reciprocably translating said at least one nozzle means;

said at least one filter-supporting means comprising a rotatable shaft having a central longitudinal axis, said shaft being mounted in said interior of said main housing so that said central longitudinal axis forms an acute angle with respect to the horizontal, whereby said shaft is inclined;

said at least one nozzle means being mounted for reciprocable translation parallel to and above said shaft;

said main housing also being mounted at an acute angle with respect to the horizontal, and comprising a front wall, a rear wall, a pair of side walls, a top wall, and a bottom wall, each said wall forming an angle with respect to the horizontal, said main housing having an outlet opening formed at the intersection between said bottom wall and one of said front and rear walls through which flows out the effluent used for washing the filters, for the subsequent disposal thereof; said acute angle of said shaft and said acute angle of said main housing being substantially the same; and frame means for supporting said main housing in its angular orientation.

15. The apparatus according to claim 14, wherein said shaft is mounted between said top wall and said bottom wall of said main housing and is substantially parallel to said front and rear walls of said main housing; said shaft comprising a lower end portion and an upper end portion, and filter-holding means provided about a portion of the circumference of said lower end portion for frictionally and removably retaining a filter thereon; said first and second parts having cooperating means for removably mounting said second part to said first part, whereby filters of different design may be accommodated thereby.

16. The apparatus according to claim 14, wherein said frame means comprises roller means for rolling the apparatus along the floor between different locations; said frame means also comprising a front section for angularly supporting said front wall of said main housing, and a rear section for angularly supporting said bottom wall of said main housing, whereby said main housing is supported in said angular orientation.

17. The apparatus according to claim 14, wherein said main housing further comprises at least one pair of spaced-apart rollers mounted in said interior by said front wall thereof, said at least one pair of rollers rotatably supporting a filter thereon; said at least one pair of rollers being positioned adjacent said upper end portion of said at least one rotatable shaft, whereby the upper end portion of a filter is rotatable supported by said at least one pair of rollers.

18. The apparatus according to claim 14, wherein drive means for rotating said at least one filter-supporting means and for driving said means for reciprocably translating said at least one nozzle means simultaneously causes translation of said at least one nozzle means and rotation of said at least one filter-supporting means; said drive means comprising a reversible motor, a plurality of sprockets, at least one said sprocket for said at least one filter supporting means, and one said sprocket for said at least one nozzle means, and a chain driven by said motor;

said drive means further comprising means operatively coupled to said at least one filter-supporting means and said at least one nozzle means for reversing the direction of rotation of said filter-supporting means substantially simultaneously with the reversal of direction of translation of said at least one nozzle means;

said drive means being mounted to and projecting downwardly from said bottom wall of said main housing.

19. A method of washing cylindrical and cylindrical-like filters of waste products embedded therein, comprising:
   a) angularly mounting a wash tank so that the bottom wall thereof and the front wall thereof form an angle with respect to the horizontal;
   b) angularly mounting a filter in the wash tank such that the longitudinal axis of the filter forms an acute angle with respect to the horizontal;
   c) continuously rotating the filter in the wash tank after said step (b);
   d) simultaneously with said step (c), translating a spray nozzle along the length of the filter;
   e) directing the flow of effluent fluid from the filter and nozzle to an exit outlet formed in a lower corner area at the intersection of the bottom wall and the front wall of the wash tank and out therethrough;
   f) filtering the effluent fluid through a filter for removing solid waste material admixed with the effluent fluid; and
   g) draining the effluent fluid away after said step (f);
   said (f) comprising passing the effluent fluid through a cloth filter mounted in a separate portable container positioned below the exit outlet; said method further comprising transporting the portable container to a refuse site after the cloth filter thereof has become used up, and disposing of the solid waste material at the refuse site; and inserting a new cloth filter to the portable container and returning the container to its position underneath the exit outlet.

* * * * *